United States Patent
Ginis et al.

(10) Patent No.: US 10,936,976 B2
(45) Date of Patent: Mar. 2, 2021

(54) WORKLOAD MANAGEMENT FOR LICENSE COST OPTIMIZATION

(71) Applicant: BMC Software, Inc., Houston, TX (US)

(72) Inventors: Boris Ginis, Brighton, MA (US);
Robert L. Ford, Wayland, MA (US);
William Northup, Waltham, MA (US);
Anthony Distauro, Milford, MA (US);
Kevin Fernandes, Houston, TX (US)

(73) Assignee: BMC Software, Inc., Houston, TX (US)

( * ) Notice: Subject to any disclaimer, the term of this patent is extended or adjusted under 35 U.S.C. 154(b) by 1433 days.

(21) Appl. No.: 14/041,753

(22) Filed: Sep. 30, 2013

(65) Prior Publication Data

US 2015/0095089 A1 Apr. 2, 2015

(51) Int. Cl.
*G06Q 10/06* (2012.01)
*G06Q 30/06* (2012.01)

(52) U.S. Cl.
CPC ....... *G06Q 10/06312* (2013.01); *G06Q 10/06* (2013.01); *G06Q 10/0637* (2013.01); *G06Q 30/0645* (2013.01)

(58) Field of Classification Search
CPC ............ G06Q 10/06312; G06Q 10/06; G06Q 10/0637; G06Q 30/0645
See application file for complete search history.

(56) References Cited

U.S. PATENT DOCUMENTS

| | | | |
|---|---|---|---|
| 6,938,027 B1* | 8/2005 | Barritz | G06Q 10/00 706/50 |
| 7,096,469 B1* | 8/2006 | Kubala | G06F 9/5077 718/100 |
| 8,756,302 B2* | 6/2014 | Cowan | G06F 11/3409 709/223 |
| 2002/0022971 A1* | 2/2002 | Tanaka | G06F 21/10 705/26.1 |
| 2002/0152305 A1* | 10/2002 | Jackson | H04L 12/26 709/224 |
| 2002/0161717 A1* | 10/2002 | Kassan | G06Q 20/1085 705/59 |

(Continued)

OTHER PUBLICATIONS

D. Gmach, J. Rolia, L. Cherkasova and A. Kemper, "Workload Analysis and Demand Prediction of Enterprise Data Center Applications," 2007 IEEE 10th International Symposium on Workload Characterization, Boston, MA, 2007, pp. 171-180, doi: 10.1109/IISWC.2007.4362193 (Year: 2007).*

*Primary Examiner* — Robert D Rines
*Assistant Examiner* — Alissa D Karmis
(74) *Attorney, Agent, or Firm* — Brake Hughes Bellermann LLP

(57) ABSTRACT

A workload change evaluator may receive workload metrics characterizing a plurality of workloads executed within a license environment during a license period, and cost metrics characterizing license costs incurred by license environment during the license period. A baseline model generator may generate a baseline model providing a time-based contribution of each of the plurality of workloads to the license cost during the license period. A cost estimator may receive a potential workload change, and may estimate a license cost change caused by the potential workload change, based on the baseline model.

20 Claims, 7 Drawing Sheets

(56) References Cited

U.S. PATENT DOCUMENTS

| | | | |
|---|---|---|---|
| 2007/0106622 A1* | 5/2007 | Boomershine | G06Q 10/06 |
| | | | 705/400 |
| 2008/0082983 A1* | 4/2008 | Groetzner | G06F 9/5083 |
| | | | 718/105 |
| 2008/0183626 A1* | 7/2008 | Romero | G06F 21/105 |
| | | | 705/59 |
| 2009/0299791 A1* | 12/2009 | Blake | G06Q 10/107 |
| | | | 705/40 |
| 2010/0228679 A1* | 9/2010 | Scapa | G06Q 30/06 |
| | | | 705/310 |
| 2012/0296852 A1* | 11/2012 | Gmach | G06Q 10/06 |
| | | | 705/400 |
| 2012/0331114 A1* | 12/2012 | Garg | G06Q 10/00 |
| | | | 709/220 |
| 2013/0042003 A1* | 2/2013 | Franco | G06F 9/45558 |
| | | | 709/226 |
| 2014/0052773 A1* | 2/2014 | Deng | H04L 67/42 |
| | | | 709/203 |

* cited by examiner

FIG. 6

WORKLOAD MANAGEMENT FOR LICENSE COST OPTIMIZATION

TECHNICAL FIELD

This description relates to workload management.

BACKGROUND

Information technology (IT) resources, such as hardware/software and associated operational budgets, are typically deployed, subject to relevant constraints, to implement various workloads associated with business operations of a business. For example, a business may utilize IT resources to manage inventory, calculate payroll, interact with customers or suppliers, or otherwise perform any desired, available business function.

In practice, a business may determine that it is cost effective, or otherwise preferable, to license required IT resources from an IT provider. For example, a business may license a specified amount of hardware and/or software, and may pay associated license costs to the IT provider on an ongoing basis, in exchange for the right to utilize the licensed IT resources, as well as for associated support, maintenance, and/or upgrades.

Such license costs are generally determined by, or negotiated with, the IT provider/licensor. The IT provider may seek to define the license costs in a manner which contemplates relevant factors, such as, e.g., profitability, customer satisfaction, and customer retention. Therefore, although license costs are generally correlated with a quantity or extent of IT resources being licensed and/or utilized, a final determination of license costs represents a business decision, and may not correspond directly, exactly, or predictably with the underlying quantity or extent of usage of the IT resources being licensed.

Due to such loose coupling between license costs and a quantity/usage of licensed IT resources, it may be difficult for a licensee, e.g., the representative business mentioned above, to optimize or otherwise manage license costs. In other words, for example, a business licensing IT resources to accomplish certain business objectives may find it difficult to accomplish those business objectives in a manner which minimizes or otherwise optimizes license costs under the terms of an existing license with a provider of the IT resources. As a result, such a business or other licensee may effectively overpay with respect to license costs, thereby expending financial resources unnecessarily and causing an undesired decrease in profitability.

SUMMARY

According to one general aspect, a system may include instructions stored on a non-transitory computer readable storage medium and executable by at least one processor. The system may include a workload change evaluator configured to cause the at least one processor to receive workload metrics characterizing a plurality of workloads executed within a license environment during a license period, and further configured to cause the at least one processor to receive cost metrics characterizing license costs incurred by license environment during the license period. The system may include a baseline model generator configured to cause the at least one processor to generate a baseline model providing a time-based contribution of each of the plurality of workloads to the license cost during the license period.

According to another general aspect, a method may include receiving workload metrics characterizing a plurality of workloads executed within a license environment during a license period, and receiving cost metrics characterizing license costs incurred by license environment during the license period. The method may include generating a baseline model providing a time-based contribution of each of the plurality of workloads to the license cost during the license period.

According to another general aspect, a computer program product may include instructions recorded on a non-transitory computer readable storage medium and configured to cause at least one processor to receive workload metrics characterizing a plurality of workloads executed within a license environment during a license period, and receive cost metrics characterizing license costs incurred by license environment during the license period. The instructions, when executed, may be further configured to cause at least one processor to generate a baseline model providing a time-based contribution of each of the plurality of workloads to the license cost during the license period.

The details of one or more implementations are set forth in the accompanying drawings and the description below. Other features will be apparent from the description and drawings, and from the claims.

BRIEF DESCRIPTION OF THE DRAWINGS

FIG. 6 is a second screenshot illustrating a cost report for IT resources being managed using the system of FIG. 1.

DETAILED DESCRIPTION

Figure 1:
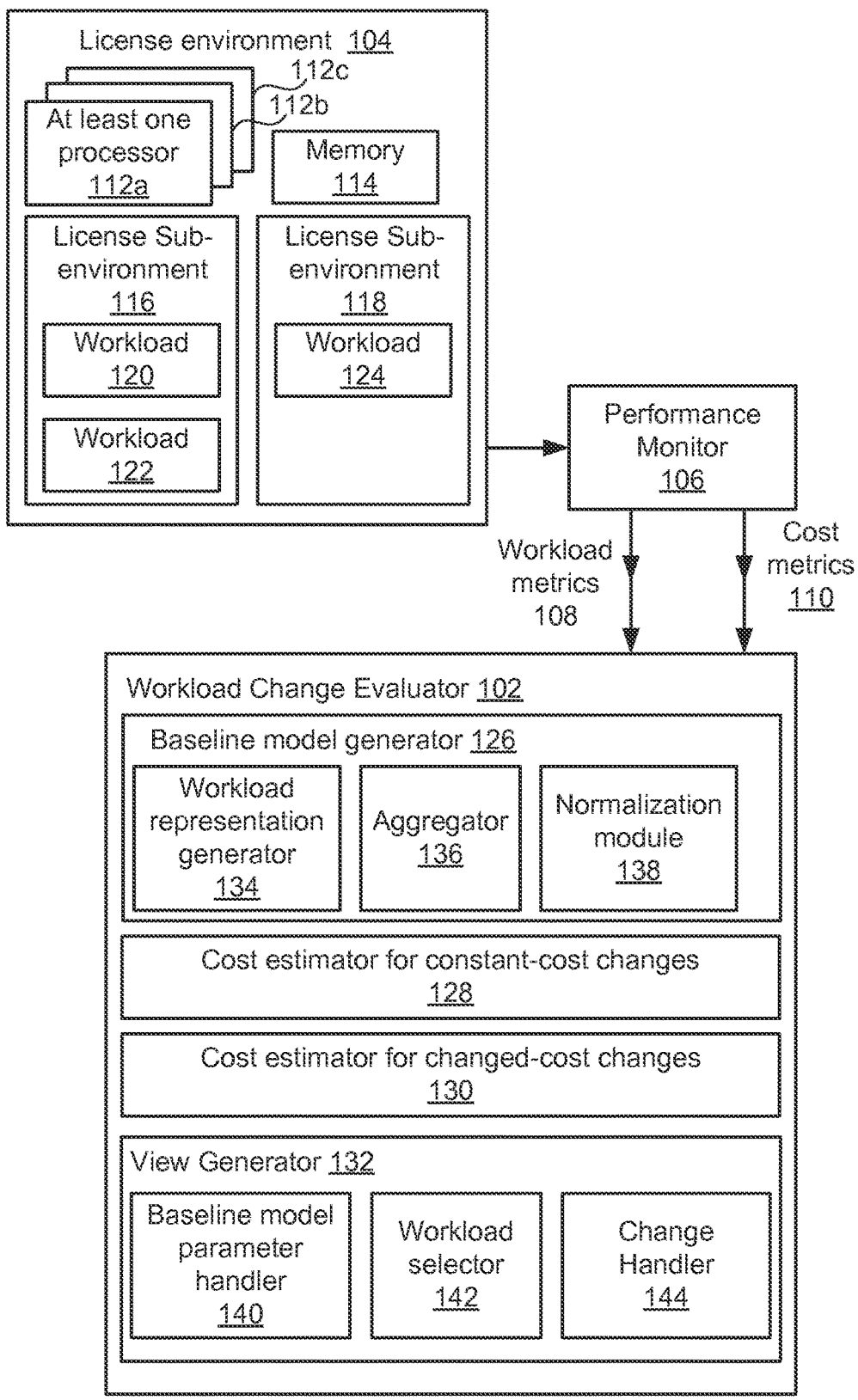
FIG. 1 is a block diagram of a system for workload management for license cost optimization.

FIG. 1 is a block diagram of a system 100 for workload management for license cost optimization. In the system 100 of FIG. 1, a workload change evaluator 102, associated with a license environment 104, may enable an authorized operator or manager of the license environment 104 to create, schedule, execute, delay, or otherwise manage workloads within the license environment 104 in a manner which reduces or otherwise optimizes license costs associated with the license environment 104.

In the example of FIG. 1, the workload change evaluator 102 is illustrated as communicating with a performance monitor 106 to receive both workload metrics 108 and cost metrics 110 associated with the license environment 104. In this regard, and as described in more detail below, the workload metrics 108 may generally be understood to represent virtually any measurement associated with operations of hardware/software within the license environment 104 which are related to, or definable in terms of, individual workloads being executed within the license environment 104. In other words, the workload metrics 108 represent performance measures of the license environment 104 expressible in terms of workloads executed within the license environment 104. For example, as described in detail below, such workload metrics may include, or be defined in terms of, capacity ratings, such as Processor Capacity Index (PCI) or Million Instructions per Second (MIPS), or may be expressed as hardware usage performance metrics, such as Central Processing Unit (CPU) seconds or CPU utilization percentage.

In contrast, the cost metrics 110 refer to performance measures which are defined, tracked, and calculated primarily or exclusively for the purpose of determining license costs to be paid by a licensee of the license environment 104 to the licensor (IT provider) thereof. As referenced above, the cost metrics 110 may be related to, or correlated with, some of the same or similar aspects of performance of the license environment 104 measured by the workload metrics 108. However, as also referenced, the cost metrics 110, by themselves, are at least partially defined or assigned with respect to business goals of a licensor (IT provider) of the license environment 104, and are therefore not expressed in terms of workloads executed within the license environment 104.

As described in detail below, the workload change evaluator 102 is therefore configured to relate workloads of the license environment 104 to associated license costs associated with licensing of the license environment 104. Consequently, an administrator, operator, or other user of the license environment 104 may be enabled to understand contributions of executed workloads to corresponding license costs. As a result, such a user may, for example, make useful predictions about future effects of creating, scheduling, executing, or otherwise managing such workloads within the license environment 104. Accordingly, scheduling of such workloads may take into account such future effects on license costs. In this way, the overall license costs associated with the license environment 104 may be reduced or otherwise optimized.

In the example of FIG. 1, the license environment 104 is illustrated as including a number of subcomponents, which are provided for the purpose of illustrating and explaining operations of the workload change evaluator 102 with respect to the workload metrics 108 and the cost metrics 110. In particular, as shown, the license environment 104 may include at least one central processing unit (CPU) 112a, as well as, in the example, additional CPUs 112b, 112c. The license environment 104 is also illustrated as including a memory 114. As may be appreciated, the memory 114 may be shared by two or more of the CPUs 112a-112c. In other examples, multiple such memories may be utilized.

Also illustrated within the example license environment 104, license sub-environments 116, 118 represent virtually any physical or logical division of available and associated computing resources, where such divisions may be related to license costs, as measured and determined through the use of the cost metrics 110. For example, the license sub-environment 116 may (or may not) be associated with higher license costs (and higher service levels) than the license sub-environment 118.

In various examples, the license sub-environments 116, 118 may correspond to physical divisions of available hardware resources. For example, the license sub-environments 116, 118 may correspond individually to one or more of the CPUs 112a-112c. Additionally, or alternatively, the license sub-environments 116, 118 may represent logical divisions of, e.g., individual ones of the CPUs 112a-112c. For example, the license sub-environments 116, 118 may represent logical partitions (LPARs), in which, for example, the CPU 112a and the memory 114 (or portions thereof) are divided to create independent, parallel computing environments. As is known, for example, such LPARs may thus be executed using separate and/or different operating systems, and may therefore execute associated applications independently of one another, among other known features and advantages.

Thus, in the example of FIG. 1, the license sub-environment 116 is illustrated as executing a workload 120 and a workload 122. Meanwhile, the license sub-environment 118 is illustrated as executing a workload 124. For example, as referenced above, such workloads 120, 122, 124, may represent virtually any discrete or defined computing tasks or application(s) defined by the user of the license environment 104, and executed using an appropriate one(s) of the CPUs 112a-112c and the memory 114. In practice, to name a few examples, such workloads may include computing tasks associated with customer management, financial management, inventory management, or manufacturing management, as well as, in other examples, interactions with customers, vendors, distributors, and/or suppliers.

As illustrated and described, the license sub-environments 116, 118 may implement such workloads independently from one another (e.g., as shown, the workloads 120, 122 may be executed independently of, and in parallel with the workload 124). Moreover, since, as referenced above, the term workload refers generally to any discrete or defined calculations executed within the license environment 104, it may also be appreciated that the license sub-environment 116 (e.g., LPAR) may itself represent a workload scheduled by a user of the license environment 104. Thus, for example, a workload of a license environment 104, for purposes of use thereof by the workload change evaluator 102, may be considered to include groups of two or more individual workloads, as well.

As referenced above, the license environment 104 is intended to conceptually represent hardware/software resources which are governed in the usage thereof by an applicable license. For example, the license environment 104, i.e., the CPUs 112a-112c and the memory 114, may represent a central processor complex (CPC), perhaps implemented using one or more mainframe computers or servers. Of course, as such, the license environment 104 may be understood to include various other components (e.g., network interfaces, power sources, input/output components) which, again, are not explicitly illustrated with respect to the license environment 104, for the sake of simplicity and brevity.

As shown and described, a user of the license environment 104 may have an ability and authorization to modify operations of the license environment 104 in a wide variety of manners. For example, such a user may add or remove workloads from within one or more of the license sub-environments 116, 118, or may move a particular workload or a group of workloads from one license sub-environment to the other. In other examples, the user may delay one or more workloads, for execution at a time later within a given license period, or within a subsequent license period. Further, such a user may add or remove an entire sub-environment (e.g., may add or remove a desired number of LPARs). Still further, such a user may add additional CPUs to the CPUs 112a-112c, or may replace one or more of the CPUs 112a-112c with newer, more powerful upgrades thereof (with similar comments being understood to apply with respect to the memory 114).

In practice, however, it may be extremely difficult for such a user to determine whether, when, and how to implement such modifications within the license environment 104. In particular, it may be difficult for the user to determine an impact of such modifications on an overall license cost charged by the licensor of the license environment 104.

As referenced above, such difficulties on the part of the user of the license environment 104 in identifying and predicting license costs for operations and modifications of the license environment 104 relate primarily to the fact that license costs are ultimately determined from a business perspective. Consequently, license costs may relate generally but not predictably or directly to actual usage of the license environment 104, nor to available performance measures thereof. For example, as referenced above, the workload metrics 108 may refer generally to performance measures of hardware usage, such as a time period that hardware was used (e.g., CPU seconds used) or relative hardware utilization (e.g., CPU utilization percentage). In other examples, as also referenced above, the workload metrics 108 may relate to performance work-related metrics, such as millions of instructions per second (MIPS) used, or traditional CPU capacity ratings, such as the processor capacity index (PCI).

It may be generally true that, all things being equal, increases in such hardware usage and/or performed-work measurements will correlate with increased license costs. However, in practice, it may be difficult to quantify such correlations in a sufficiently timely and accurate manner to assist a user of the license environment 104 in making decisions regarding potential modifications to the license environment 104. Moreover, as referenced above, all things are not necessarily equal in making comparisons of changes in hardware/software used, or work performed.

For example, the same or greater hardware usage during implementation of a particular workload may result in reduced license costs, if the usage occurs at night rather than during the day, or during any low usage time period with respect to the license environment 104 as a whole. In other scenarios, a newer or upgraded version of a CPU may incur smaller license costs for a similar amount of work performed when compared to a previous or older version of the CPU, as part of an effort of the licensor to incentivize the user of the license environment 104 to commit budget resources to pay for such hardware upgrades.

Somewhat similarly, the licensor of the license environment 104 may wish to incentivize the user of the license environment 104 to purchase hardware having a hardware capacity which appreciably exceeds current usage requirements of the user of the license environment 104, in order to sell or license a maximum available quantity of such hardware. Therefore, in recognition of the inclusion of such excess capacity, the licensor may offer sub-capacity planning, in which the user of the license environment 104 pays a license cost that is partially determined by an extent to which the overall capacity of the license environment 104 is used. In such scenarios, for example, the cost metrics 110 may be measured as part of an aggregated four hour rolling average (4HRA) across all relevant LPARs, and a peak or maximum of such values within a license period (e.g., monthly) may be utilized to determine an actual license cost paid by the user of the license environment 104 for that license period.

In specific examples provided below, the cost metrics 110 may include millions of service units (MSUs) used per hour. In this regard, as is known, MSUs refer to a cost metric defined with respect to a MSU rating associated with a specific processor type and model. In this regard, the MSU may be understood to have the characteristics of the cost metrics 110 referenced above. That is, for example, the MSU may be used in the context of a particular licensing/pricing model in which customers are charged, e.g., per MSU consumed, or by total MSU system capacity. However, as also referenced, the MSU rating applied to a particular processor type/model is ultimately a business decision and may correlate in a non-linear and/or difficult to predict manner with respect to actual hardware usage or work performed within the license environment 104. For example, a new, current mainframe model may have a 10% lower MSU rating for the same level of system capacity of a previous version of the mainframe model, so that customers are incentivized to upgrade to the new, current model. Thus, in these and related scenarios, decreasing or increasing MSUs will not necessarily show a proportional change in license costs.

Of course, it is true that license costs are clearly defined within a license contract between the licensor and the licensee (e.g., user) of the license environment 104. For example, the cost metrics 110 may be clearly defined to include the four hour rolling average (4HRA) referenced above, a total number of MSUs used within a defined license period, or an average number of MSUs used within the license period, so that the user of the license environment 104 may easily determine a current license cost being incurred. However, as referenced above and described in detail herein, the mere knowledge of current or projected license costs is not sufficient to assist the user of the license environment 104 in managing resources of the license environment 104, particularly with respect to management at the workload level.

For example, as also referenced, workload changes within the license environment 104 may typically be described on the level of individual workloads (e.g., applications) and/or in terms and units of traditional CPU capacity ratings (e.g., CPU usage and/or work-related metric). Thus, it may be appreciated that successful evaluation of workload changes within the license environment 104, as executed by the workload change evaluator 102, relies on overcoming difficulties related to the types of, and differences in, workload/cost measurements described above.

For example, as described in detail below, the workload change evaluator 102 may be configured to relate workload-level performance measurements with machine-aggregate cost units. Moreover, the workload change evaluator 102 may be configured to determine resource consumption values for both capacity and cost in scenarios in which workloads are moved among different computing devices and/or when machine processors are upgraded. In this way, the workload change evaluator 102 provides a historical analysis of contributions of individual or groups of workloads to incur license costs, and enables the prediction of changes in license costs in response to changes in workload activities and/or other hardware/software changes within the license environment 104.

Thus, the workload change evaluator 102 is illustrated as including a baseline model generator 126, which is configured to create a baseline model illustrating a time-based contribution of each specified/selected workload within a defined license period to actual license costs incurred during that license period. For example, for license costs charged on a monthly basis, the baseline model generator 126 may provide, e.g., for a preceding month, a model illustrating the time-varying license cost incurred, relative to a time-based representation of all relevant workloads executed during the identified month. An example representation of such baseline model is provided below, e.g., with respect to FIG. 7.

The resulting baseline model thus provides exact correlations between selected, identified individual workloads, or groups of workloads, at any point in time, with respect to license costs incurred at the corresponding point in time. With this information, cost estimators 128, 130 may be configured to predict future license costs that may be incurred in response to potential workload changes (e.g., adding, deleting, or delaying workload(s)) within the license environment 104.

As shown, the cost estimator 128 represents a cost estimator for constant-cost changes, in which workloads are moved or otherwise altered without simultaneously changing cost-related ratings or other cost parameters. For example, as referenced above, a MSU rating may be specific to a particular processor type/model, so that workload movements within a single processor, or within and among processors sharing the same MSU ratings, will not generally be associated with changes in cost-related ratings. For example, adding a new workload to the license sub-environment 118 (e.g., LPAR) would not be expected to be associated with a change in a cost-related rating for the new workload, or for the license sub-environment 118 itself. More generally, increases or decreases in workload volumes within a single LPAR, or changes in a capacity of an individual LPAR itself, or movements of workloads between and among LPARs (e.g., movement of the workload 122 from the license sub-environment 116 to the license sub-environment 118) would not be expected to cause changes in corresponding cost ratings.

In other words, for such constant-cost changes, the cost estimator 128 may analyze the baseline model provided by the baseline model generator 126 to determine information contained therein that may be relevant to a proposed, potential workload change. Based thereon, the cost estimator 128 may extrapolate to determine associated license costs, which would thus be incurred if the same or similar workload were implemented in an analogous circumstance during an upcoming license period (e.g., within the next month).

For example, in a highly simplified example, the cost estimator 128 may utilize the baseline model of the baseline model generator 126 to determine a license cost incurred by the workload 122 executed over the period of one week within a preceding month. Then, the cost estimator 128 may project a similar contribution to a license cost of a similar execution of the workload 122 during an upcoming month, even if the workload 122 is executed using the license sub-environment 118, rather than the license sub-environment 116.

In a more specific example, as is known and as is referenced above, certain licenses may be structured such that license costs depend heavily upon a maximum or peak usage of resources of the license environment 104 within a specific license period (e.g., month). Then, by knowing a contribution of the workload 122 from the baseline model, the cost estimator 128 may be leveraged to assist the user of the license environment 104 in scheduling the workload 122 for execution during a week of otherwise-low usage of resources of the license environment 104, rather than a week of high resource usage. In this way, a peak or maximum usage of hardware resources of the license environment 104 may be reduced, so that overall license costs may be reduced, as well. For example, one or more workloads may be delayed, so that execution(s) thereof occur in a later time period, perhaps in a different license period, in order to lower the peak or maximum usage within a current license period.

In other scenarios, proposed or potential workload changes may be associated with corresponding changes in cost ratings. For example, as referenced above, an upgrade of the CPUs 112*a*, 112*b* 112*c* to a newer, current version may result in a changed MSU rating for the new processor type/model, as compared to the previous version thereof. In addition to such hardware upgrades, movements of workloads, including the partial or complete movements of LPARs, between different processor types (e.g., between different CPCs) may be understood to represent scenarios in which relevant cost ratings may be changed.

Therefore, the cost estimator 130 may be configured to utilize the baseline model of the baseline model generator 126 to accurately predict license costs that will be incurred during such changed-cost workload changes. For purposes of description with respect to FIG. 1, it may generally be understood that the cost estimator 130 may be configured to consider characteristics of a source processor with respect to a relevant workload, relative to a target processor that will be executing the same workload. In so doing, the cost estimator 130 enables accurate predictions of proposed/potential workload changes, even when such workload changes involve corresponding changes in related cost ratings. More detailed examples of operations of the cost estimator 130 are provided below, e.g., with respect to FIG. 4.

Further in FIG. 1, the workload change evaluator 102 is illustrated as including a view generator 132. The view generator 132 enables interactions with the user of the license environment 104, so that, for example, the user may generate the baseline model in a desired format and with a desired level of detail. Further, the view generator 132 may enable the user to propose and execute desired workload changes within the license environment 104, with full and accurate knowledge of cost implications with respect to the license governing operations of the license environment 104. Further example details of the view generator 132 are provided below in conjunction with additional description of the workload change evaluator 102 of FIG. 1, and example screenshots of graphical user interfaces that may be provided by example implementations of the view generator 132 are provided below, with respect to the screenshots of FIGS. 5-7.

By way of providing additional detail regarding the baseline model generator 126 (where even further example details are provided below, with respect to FIG. 3), the baseline model generator 126 is illustrated as including a workload representation generator 134, an aggregator 136, and a normalization module 138. In general, the workload representation generator 134 may be configured to provide a time-based representation of individual or otherwise-selected workloads within an identified license period (e.g., month). The workload representation generator 134 may be configured to provide such a time-based representation for each workload of each license sub-environment (e.g., LPAR) of the license environment 104. In other words, for the simplified example of FIG. 1, the workload representation generator 134 may generate such a time-based representation for each workload 120, 122, 124 of the included license sub-environments 116, 118, or for each license sub-environment 116, 118 as a whole.

In general, the workload representation generator 134 may use any available or appropriate technique to provide a time-based representation of a designated workload. Such techniques may depend, in part, upon a type and extent of the workload metrics 108 that are available to the workload representation generator 134. Where feasible, the workload representation generator 134 may be optimized by selecting and utilizing available workload metrics of the workload metrics 108 to generate a corresponding time-based representation of selected workloads in a manner which mimics or otherwise corresponds to the time-varying characteristics of the cost metrics 110.

For example, as referenced above, the cost metrics 110 may be calculated with respect to a four hour rolling average (4HRA) of measured cost metrics (e.g., MSUs). Therefore, the workload representation generator 134 may also quantify available workload metrics 108 with respect to four hour intervals. In so doing, it may be appreciated that a correspondence of available workload metrics with relevant cost metrics may not be exactly or precisely available. For example, in the example just referenced, it may occur that the workload metrics 108 are collected at different time intervals than the cost metrics 110, so that, even if the time-varying representations of selected workloads and corresponding license costs are represented in terms of a four hour rolling average, a measurement granularity of the two time-based representations may be different. Nonetheless, as described in detail below, the resulting time-based workload representations provided by the workload representation generator 134 provide a useful starting point for construction of the baseline model.

Once all relevant workload representations have been provided, an aggregator 136 may be configured to aggregate all available workload representations for all relevant license sub-environments (e.g., LPARs). More specifically, the aggregated workload representations may be aligned with one another and with the time-varying representation of the overall license cost. In providing such aggregations, the aggregator 136 may resolve the differences in measurement granularity, including matching aggregated workload values at the workload level with corresponding license costs measured at the LPAR (or CPC) level.

Then, the normalization module 138 may be configured to normalize contributions of individual or selected workloads with respect to one another and with respect to the corresponding license costs. For example, at a given point in time, corresponding aggregated workload values may be matched to a corresponding total license cost. Then, the normalization module 138 may relate, e.g., on a percentage basis, contributions of individual workloads to the corresponding license cost incurred. Thus, the baseline model referenced above may be understood to include the resulting aggregated, normalized workload representations for a specified license period, relative to incurred license costs during a relevant time period.

As also referenced above, the view generator 132 may be utilized in configuring, generating, and utilizing the baseline model, so as to ultimately select and execute desired workload changes within the license environment 104. For example, as shown in FIG. 1, the view generator 132 may include a baseline model parameter handler 140, with which the user of the license environment 104 may configure operational parameters of the baseline model generator 126.

For example, the baseline model parameter handler 140 may enable the user of the license environment 104 to designate a level at which the baseline model will be generated. For example, the baseline model may be generated at a level of individual workloads (e.g., workloads 120, 122, 124), or at a level of entire license sub-environments (e.g., license sub-environments 116, 118). In other examples, the user may designate specific groups or collections of workloads to be utilized in generating the baseline model. The user may also designate particular types of the workload metrics 108 to utilize, and/or may designate a manner in which the time-varying workload representations are generated. By way of more specific examples with respect to the latter example, the user may designate a four hour rolling average (4HRA) to be used in providing the time-varying workload representations, or may otherwise designate a manner in which the resulting time-based workload representation corresponds to the time-based license cost.

As referenced above, the view generator 132 also may enable the user of the license environment 104 to interact with a resulting baseline model generated by the baseline model generator 126. For example, as referenced above and illustrated below with respect to FIG. 7, the baseline model may include a time-varying representation of aggregated workloads with respect to corresponding license costs. However, the user may wish to select and view contributions of individual or groups of workloads. Consequently, a workload selector 142 may enable the user to designate individual or groups of workloads, in order to determine contributions thereof to corresponding license costs.

Finally with respect to the view generator 132, a change handler 144 may be configured to receive change requests from the user, specifying proposed or potential workload changes. For example, the change handler 144 may receive a request to add or remove a specific workload, to delay a time of execution of a particular workload, to modify a length of time of execution of a particular workload, or to move workloads from one part of the license environment 104 to another part. Then, the change handler 144 may be configured to interact with the appropriate one of the cost estimators 128, 130, depending on the type of change requested, to thereby provide the user with information regarding projected license costs that will be incurred in conjunction with the proposed/potential workload change.

In the example of FIG. 1, the workload change evaluator 102 is illustrated separately from the license environment 104 and the performance monitor 106, and is further illustrated and described as including various individual, discrete components and subcomponents 126-144. However, as referenced above, it may be appreciated that the example of FIG. 1 is intended to provide a simplified, conceptual example of various possible implementations. As such, it may be appreciated, for example, that the workload change evaluator 102 may be itself implemented within the license environment 104, e.g., using an appropriate one of the CPUs 112a-112c and the memory 114. In so doing, the workload change evaluator 102 may itself be considered the workload of the license environment 104, and modeled as such within a designated license period for which a corresponding baseline model is generated. Of course, the workload change evaluator 102 may also be implemented separately from the license environment 104 using appropriate hardware/software resources.

In additional or alternative example implementations, the workload change evaluator 102 may be implemented in a distributed fashion. For example, some or all of the view generator 132 may be implemented at a location of the user of the license environment 104, while operations and calculations performed by the baseline model generator 126 and the cost estimators 128, 130 may be performed at a remote network location.

Further, to the extent that the various components and subcomponents 126-144 of the workload change evaluator 102 are illustrated as separate, discrete components and subcomponents, it may again be appreciated that such illustration is merely for the sake of clarity and convenience, and various other embodiments may be implemented. For example, any single component or subcomponent of the workload change evaluator 102 may be implemented using two or more subcomponents thereof. Similarly, but conversely, any two or more components or subcomponents may be combined, where appropriate and desired, for implementation as a single component. Further, various other additional or alternative components may be included, and one or more components or subcomponents may be omitted in the context of a particular implementation of the workload change evaluator 102.

Figure 2:
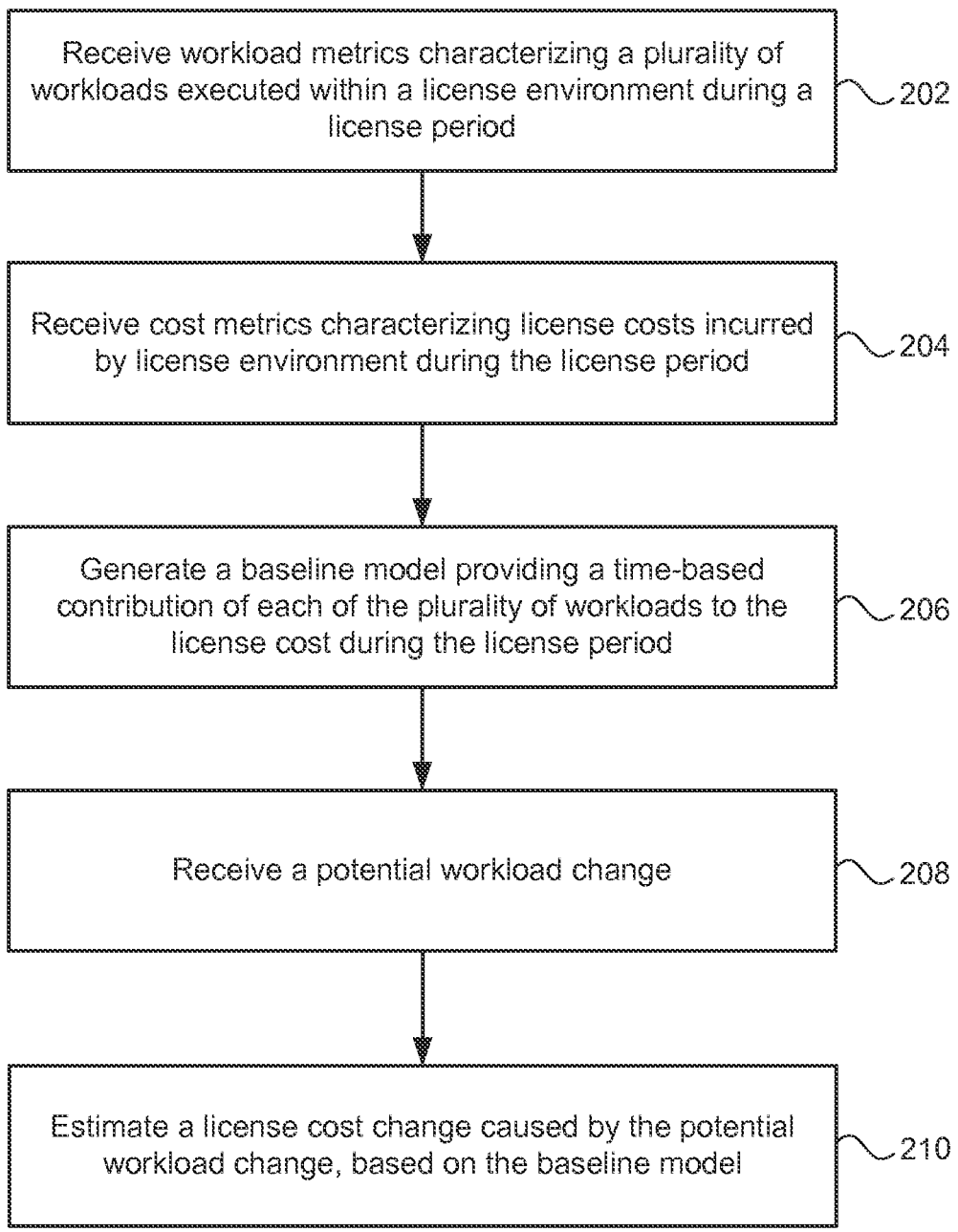
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations. However, it may be appreciated that, in various alternative implementations, any two or more of the operations 202-210 may be executed in a partially or completely overlapping or parallel manner, or in a nested, iterative, looped, or branched fashion. Moreover, in all such implementations, it may be appreciated that additional or alternative operations may be included, while one or more operations may be omitted.

In the example of FIG. 2, workload metrics characterizing a plurality of workloads executed within a license environment during a license period may be received (202). For example, a workload change evaluator 102 may be configured to receive the workload metrics 108 from the performance monitor 106, with respect to the license environment 104. A license period, e.g., a month, may be specified. In this regard, it may be appreciated that the license period may be defined or expressed with respect to a date range that is a defined fraction (or multiple) or other portion of time periods defined by the license itself. For example, when license charge costs are on a monthly basis, the workload metrics 108 may be tracked for a license period of two months, or half of a month.

Cost metrics characterizing license costs incurred by the license environment during the license period may be received (204). For example, the workload change evaluator 102 may receive the cost metrics 110 from the performance monitor 106 with respect to the license environment 104, as described above with respect to FIG. 1.

A baseline model providing a time-based contribution of each of the plurality of workloads to the license cost during the license period may be generated (206). For example, the baseline model generator 126 may provide a normalized aggregation of time-based workload representations within a defined license period (e.g., month), relative to the license cost incurred during that license period.

A potential workload change may be received (208). For example, the cost estimator for constant-cost changes 128 or the cost estimator for the change-cost changes 130 may receive a proposed or potential workload change from an authorized user of the license environment 104, perhaps by way of the change handler 144 of the view generator 132. For example, such a potential workload change may include an addition, removal, delay, or other alteration of one or more workloads.

A license cost change caused by the potential workload change may be estimated, based on the baseline model (210). For example, in the case of the cost estimator for constant-cost changes 128, cost estimation may proceed based on a contribution of the relevant workload identified from within a month for which the baseline model was generated, in consideration of various other licensing terms that may be relevant.

For example, the cost estimator 128 may consider a proposed time of the potential workload change, perhaps in conjunction with other scheduled workloads which at least partially overlap with the proposed workload change. It will be appreciated that the proposed or potential workload change may be represented in a manner analogous to the various time-based workload representations of the various workloads executed within the relevant license period. In this way, for example, the potential workload change may be quantified in a sufficiently analogous manner to the previously-characterized workloads to enable meaningful cost estimates, even in cases where the potential workload change includes an entirely new workload, which was not previously considered as such within the baseline model.

As referenced above with respect to FIG. 1, and described in more detail below with respect to FIG. 4, potential workload changes which are associated with changed cost ratings may be handled by the cost estimator for change-cost changes 130. As described herein, the cost estimator 130 may execute many of the estimation processes described above with respect to the cost estimator 128, in conjunction with consideration of both a source and target processor and respective, associated cost metrics, relative to execution of the potential workload change. Accordingly, as described herein, the user of the license environment 104 may be enabled to make timely and accurate determinations regarding whether, when, and how to implement the potential workload change.

Figure 3:
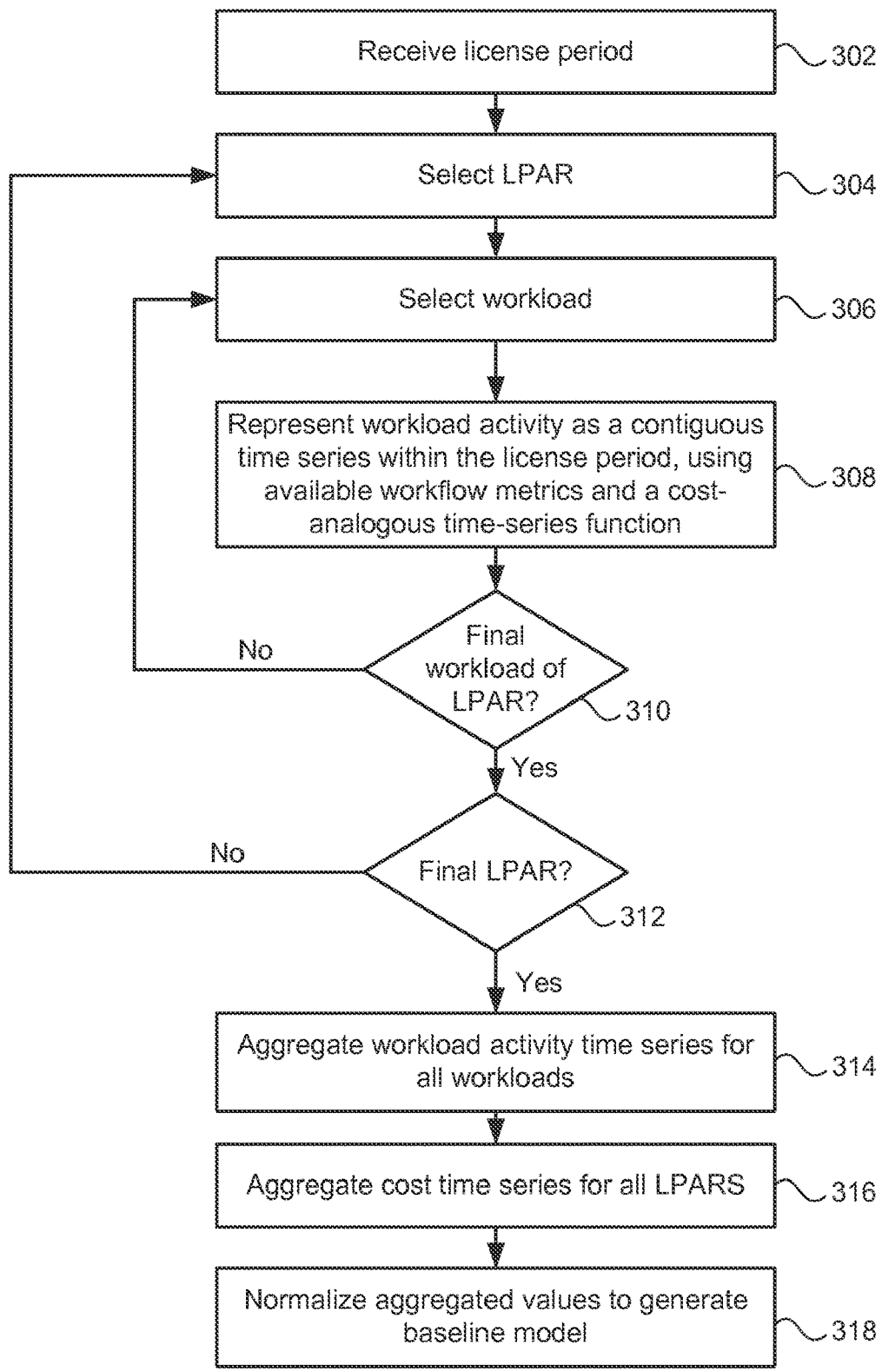
FIG. 3 is a flowchart illustrating more detailed example operations for generating a baseline model in the system of FIG. 1.

FIG. 3 is a flowchart 300 illustrating more detailed example operations of the baseline model generator 126 of FIG. 1. In the example of FIG. 3, a selected license period may be received (302). For example, the user of the license environment 104 may designate a previous month or other appropriate license period. As referenced above, the user may select two or more months, or portions thereof, or may select a custom date range relative to defined license periods.

In the example of FIG. 3, it is assumed that multiple LPARs are being executed within the license environment 104 (e.g., represented by the license sub-environments 116, 118). Therefore, the baseline model generator 126, i.e., the workload representation generator 134, may initially select a first LPAR, to begin constructing workload representations with respect to workloads being executed by the selected LPAR.

Within the selected LPAR, a first workload may be selected (306). For example, the workload 120 may be selected.

Workload activity of the selected workload may then be represented as a contiguous time series within the designated license period, using available workload metrics and cost-analogous time series function (s) (308). In the example of FIG. 3, it is assumed that the relevant cost metric includes a four hour rolling average (4HRA) of MSUs, so that a cost-analogous time series function to be used with respect to associated workload metrics might include a four hour rolling average of a comparable and available workload metric (e.g., an average CPU utilization percentage). In such scenarios, the activity of the selected workload may be presented as a contiguous time series covering an entire license period, e.g., an entire month, including at least three hours of a preceding month (so that the first several hours of the selected license period may be included in the context of the four hour rolling average). All time periods in which the selected workload does not exist may be assigned an activity level of zero.

If the selected workload is not the final workload of the selected LPAR (310), then a subsequent workload may be selected (306). Otherwise (310), if the selected LPAR is not the final LPAR (312), then a subsequent LPAR may be selected (304).

Once all the workloads of all relevant LPARs have been represented, the aggregator 136 may proceed to aggregate all represented workload activity time series for all represented workloads (314). Similarly, the cost time series for all LPARs may be aggregated (316). Finally in FIG. 3, the normalization module 138 may proceed to normalize the aggregated values for the workload activity time series for all workloads, relative to the aggregated cost time series for all LPARs, to thereby generate the baseline model (318). Additional illustration and explanation of the resulting normalized, aggregated values within the baseline model are provided below with respect to FIG. 7.

Figure 4:
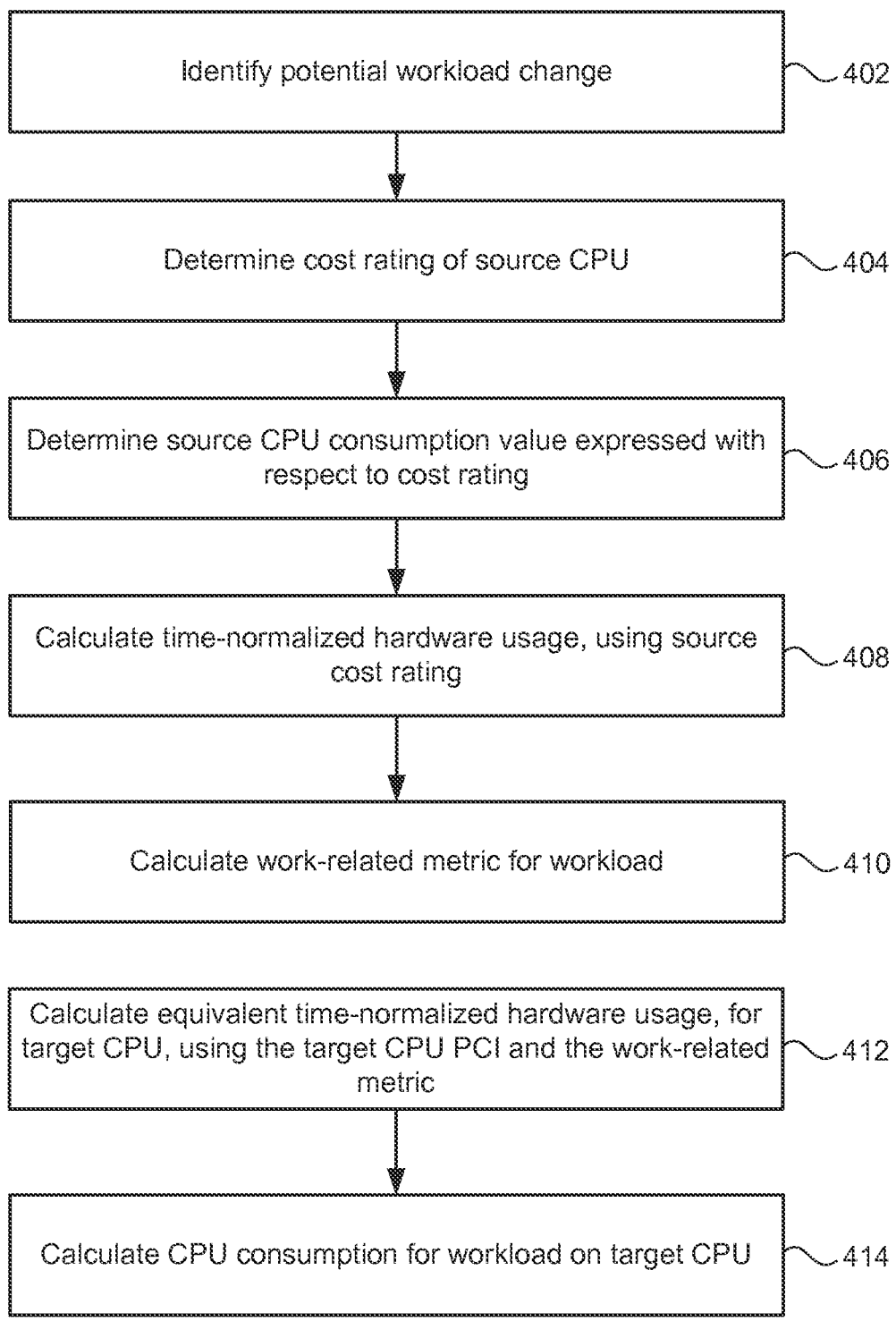
FIG. 4 is a flowchart illustrating more detailed example operations for license cost estimations for changed-cost workload changes.

FIG. 4 is a flowchart 400 illustrating more detailed example operations of the cost estimator for changed-cost changes 130 of FIG. 1. In the example of FIG. 4, as described above with respect to the cost estimator 130, it is assumed that the proposed or potential workload change involves changed hardware characteristics which are associated with changes in corresponding cost ratings. As referenced, examples of such workload changes may include CPC hardware upgrades, LPAR movements between CPCs, and total or partial workload movements between different CPCs. In FIG. 4, the potential workload change includes a workload change from a source processor having a source cost rating to a target processor having a target cost rating, and the license cost change is estimated using a cost-independent workload metric to relate the target cost rating to a target processor consumption value.

In FIG. 4, then, the potential workload change may be identified (402), such as in response to a requested workload change received by way of the change handler 144 of the view generator 132. Then, a cost rating, e.g., a MSU rating, may be determined for a source CPU (404), i.e., a current CPU being used to implement a workload to be moved to a different, target CPU.

Then, a consumption value for the source CPU may be expressed with respect to the cost rating (e.g., the MSU rating) of the source CPU (406). For example, as illustrated below with respect to Table 1, a source processor having model number 2817-705, a corresponding MSU rating may equal 650 MSU. Therefore, for a CPU consumption of 325 MSUs, an equivalent hardware usage may be observed to be 0.5 for the measurement period, or 50%. Thus, these calculations represent a time-normalized hardware usage for the source CPU and associated cost rating (408).

Then, using the cost rating of the source CPU, an equivalent work-related metric for the workload change may be calculated (410). The work-related metric may be expressed in units which are independent of any particular type of hardware.

Then, for example, if the source CPU has a processor capacity index (PCI) rating of 5300, as illustrated in Table 1, below, then the resulting work-related metric in the example of table 1, for the 50% equivalent hardware usage scenario would be equivalent to 2650.

TABLE 1

| Source Processor 2817-705 | |
|---|---|
| Processor Capacity Index | 5300 |
| MSU Rating | 650 |
| CPU Consumption in MSU | 325 |
| Calculate time-normalized hardware usage | 325/650 |
| Time-normalized hardware usage | 50% |
| Calculate work-related metric for workload A | 5300*50% |
| Work-related metric for workload A | 2650 |

As just referenced, the CPU consumption and the PCI are independent of the type of hardware used, so that the work-related metric will be the same for the same workload with respect to the target CPU associated with the potential workload change, as illustrated in Table 2, below. Therefore, an equivalent time-normalized hardware usage for the target CPU may be calculated, using the target CPU cost rating and the previously-calculated work-related metric (412). For example, as shown in Table 2, if the target CPU cost rating is 1350, the equivalent hardware usage on the target CPU (e.g., having model 2827-709) with a PCI rating of 11137, may be calculated to be equal to 23.8%.

Finally with respect to FIG. 4, an equivalent consumption value for the potential workload change on the target CPU may be calculated (414). In other words, for example, using the MSU rating of the target CPU and its estimated hardware usage of the workload, the equivalent CPU consumption may be calculated. Thus, in the example of Table 2, if the MSU rating of the target system is 1350 MSU, than the CPU consumption of the above workload will be 321 MSU.

TABLE 2

| Target Processor 2827-709 | |
|---|---|
| Processor Capacity Index | 11137 |
| MSU Rating | 1350 |
| Work-related metric for workload A from Table 1 | 2650 |
| Calculate time-normalized hardware usage | 2650/11137 |
| Time-normalized hardware usage | 23.8% |
| Calculate CPU consumption in MSU | 1350*23.8% |
| CPU consumption in MSU | 321 |

Figure 5:
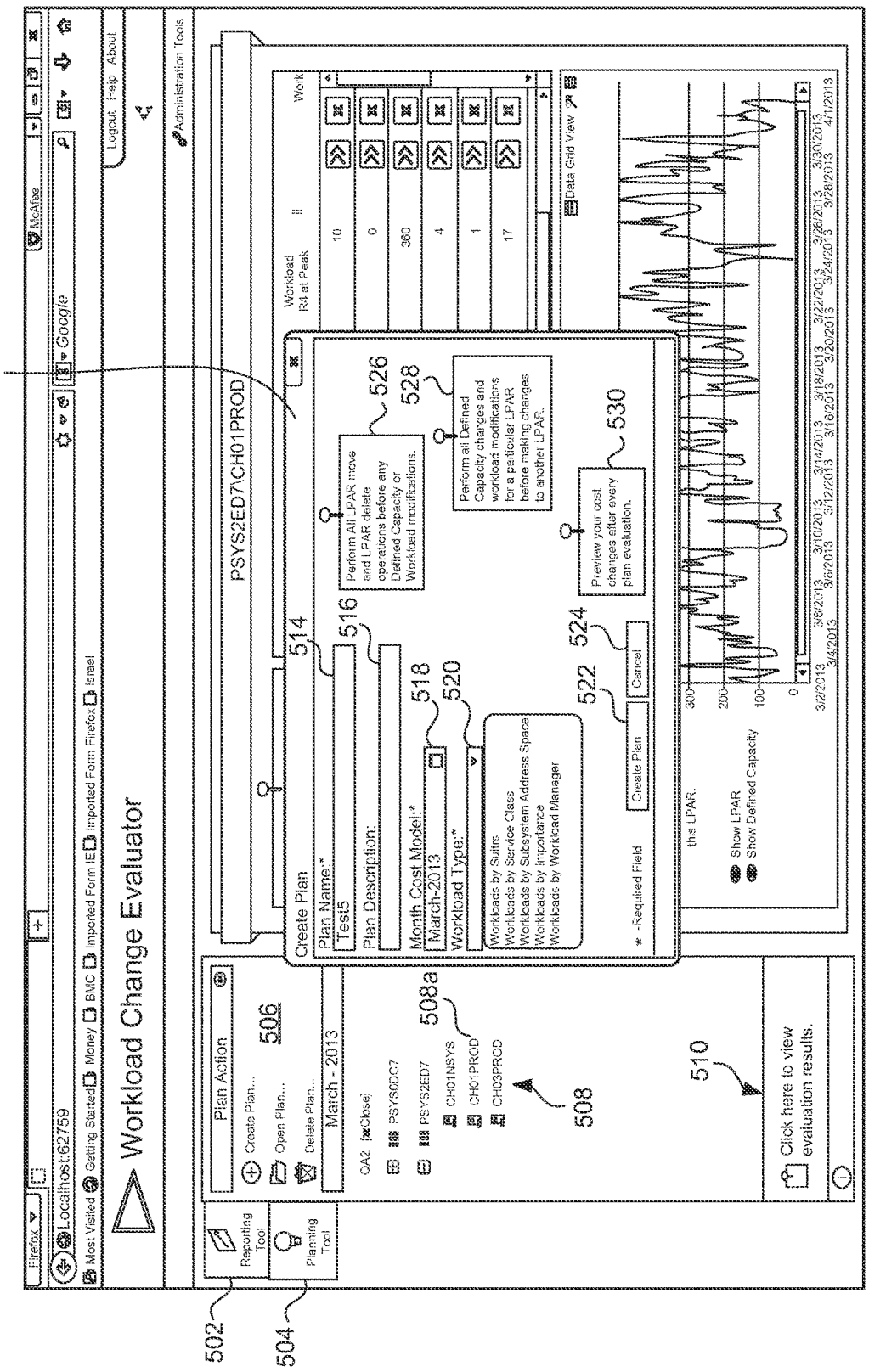
FIG. 5 is a screenshot for creating a plan for workload management using the system of FIG. 1.

FIG. 5 is a screenshot 500 illustrating an example graphical user interface provided by the view generator 132. The screenshot 500 illustrates a reporting tool tab 502 and a planning tool tab 504. As shown in the plan action session 506, workload change plans may be created, opened, or deleted. Meanwhile, a section 508 lists available CPCs and associated LPARs, including LPAR CH01PROD 508A, which, as shown in window 512, has been selected for creation of a workload change plan. Meanwhile, a section 510 is selectable to view evaluation results of the created workload change plan.

As shown within the window 512, a field 514 provides for a name for the plan to be created, while field 516 provides for a plan description. A selection bar 518 enables selection of a particular month and associated cost model (with the month of March 2013 being selected in the example). A drop-down list 520 enables selection of workloads by workload type. In the example, as shown, workloads may be selected by suites, service class, subsystem address base, importance, or workload manager. Then, the proposed workload plan may be created through selection of button 522, or the plan may be cancelled using button 524.

Further with respect to window 512, plan creation notes 526, 528, 530 may be provided to assist the user. For example, as shown, the note 526 provides a reminder to perform all LPAR move and LPAR delete operations before any defined capacity or workload modifications. The note 528 provides a reminder to perform all defined capacity changes and workload modifications for a particular LPAR before making changes to another LPAR. Finally, the note 530 provides a reminder to review cost changes after every plan evaluation.

Figure 6:
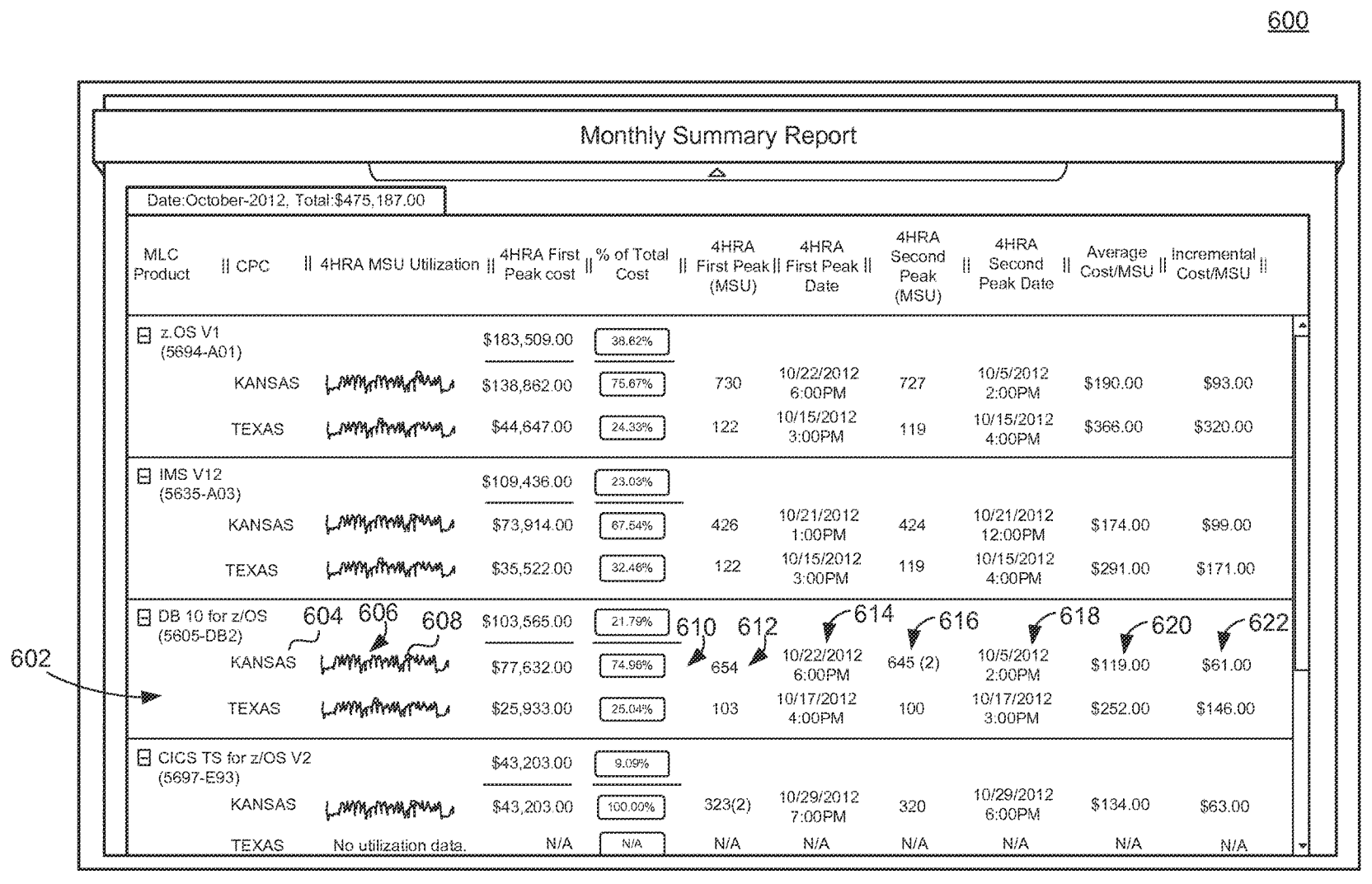

FIG. 6 is a screenshot 600 illustrating a monthly summary report for the month of October 2012, during which a total of $475,987 of budget expenditures were incurred. As shown in the screenshot 600, the monthly summary report includes an identification of corresponding product, associated CPCs, and associated 4HRA MSU utilization metrics.

By way of example, a section 602 for product DB 10 for z/OS includes a section 604 identifying a CPC named Kansas and a CPC named Texas. For the example of the CPC Kansas, a 4HRA MSU utilization 606 includes a 4HRA first peak value 608, as illustrated. Meanwhile, a section 610 graphically illustrates a percent of total cost attributed to the relevant product by the corresponding CPC. A section 612 illustrates corresponding 4HRA first peak values, expressed in MSUs, along with a corresponding 4HRA first peak date in section 614. Continuing the example, a 4HRA second peak value is expressed in section 616, along with a corresponding 4HRA second peak date in section 618. An average cost per MSU may be expressed in section 620, along with a corresponding incremental cost per MSU illustrated in section 622.

Figure 7:
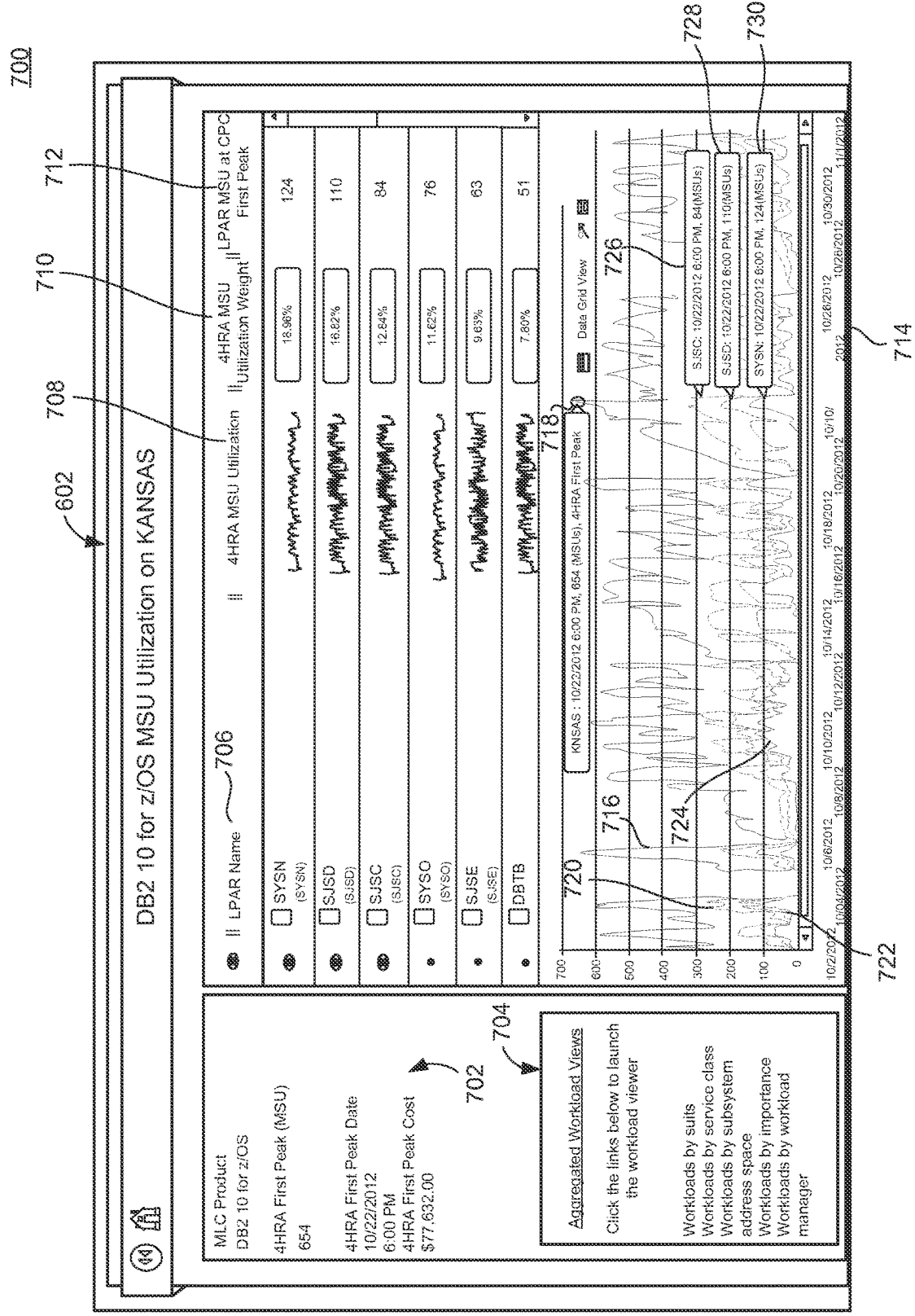
FIG. 7 is a third screenshot illustrating relationships between specified workloads and associated license costs.

FIG. 7 is a screenshot 700 illustrating further details regarding the product DB 10 for z/OS MSU utilization on CPC Kansas of section 602 in FIG. 6. As shown, relevant information from section 602 of FIG. 6 is reproduced in a section 702, along with a selection window 704 for selected LPAR views (again representing aggregate workloads, e.g., by suites, service class, subsystem address, importance, or workload manager), using a corresponding workload viewer.

Specifically, as shown, a column 706 includes LPAR names for the selected CPC Kansas. Column 708 illustrates a corresponding 4HRA MSU utilization for each LPAR. A column 710 illustrates a 4HRA MSU utilization weight, by percentage, for each LPAR. Further, a column 712 provides a LPAR MSU at a first peak of the corresponding CPC.

Then, a baseline model 714 may be generated for the identified month of October 2012, and for the identified CPC and associated LPARs. Thus, in the baseline model 714, a cost graph 716 illustrates aggregated license costs for all of the LPARs of column 706. As may be appreciated, the license cost graph 716 may be determined using corresponding ones of the cost metrics 110.

As shown, a first 4HRA peak 718 for the CPC Kansas may be observed to occur on Oct. 22, 2012, at 6:00 pm, and having a value of 654 MSUs. Meanwhile, workload contributions of individual LPARs are illustrated in the baseline model 714 using corresponding workload representation graphs 720, 722, 724.

That is, as shown, the workload representation graph 720 corresponds to the LPAR SJSC within the column 706. The workload representation graph 722 corresponds to the LPAR SJSD, and the workload representation graph 723 corresponds to the LPAR SYSN of the column 706. As may be observed, the workload representation graphs 720, 722, 724 thus represent normalized contributions of each corresponding LPAR to the overall license cost represented by the license cost graph 716.

As referenced above, actual license costs incurred in accordance with a corresponding license may depend upon peak usage values, e.g., the peak value 718 and the baseline model 714. Therefore, in the baseline model 714, a contribution of the identified LPARs SASC, SJSD, and SYSN to the peak value 718 may be determined. Specifically, as shown in corresponding window 726, the LPAR SJSC may be observed to contribute 84 MSUs to the peak value of 654 MSUs. Similarly, in window 728, the LPAR SJSD is observed to contribute 110 MSUs, while in the window 730, the LPAR SYSN is observed to contribute 124 MSUs.

Implementations of the various techniques described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system for executing a plurality of workloads on a mainframe computer, the system including instructions stored on a non-transitory computer readable storage medium and executable by at least one processor, the system comprising:
    a workload change evaluator configured to cause the at least one processor to receive first metrics that measure performance of each of the plurality of workloads executed on the mainframe computer, and second metrics that measure license costs incurred by different divisions of computing resources utilized on the mainframe computer other than workloads executed on the mainframe computer;
    a baseline model generator configured to cause the at least one processor to generate a baseline model combining the first metrics and the second metrics to provide a time-based contribution of each of the plurality of workloads executing on the mainframe computer to license costs during a license period; and
    a change handler configured to cause the at least one processor to:
        receive a workload change request, wherein the workload change request includes a workload change from a source processor to a target processor, the source processor having a source cost rating that is different from a target cost rating of the target processor,
        determine, based on the baseline model, a change in the license costs caused by the workload change during the license period, and
        change a distribution of the plurality of workloads across the different divisions of the computing resources by moving the plurality of workloads from the source processor to the target processor responsive to the change in the license costs.

2. The system of claim 1, wherein the at least one processor is configured to estimate the change in the license costs by using a cost-independent first metric to relate the target cost rating to a target processor consumption value.

3. The system of claim 1, wherein the first metrics provide performance measures of processors within the license environment and include capacity ratings of the processors during times that the plurality of workloads are executed during the license period.

4. The system of claim 1, wherein the second metrics are based on cost ratings of processors within the license environment previously defined by a licensor of the license environment.

5. The system of claim 1, wherein the baseline model generator includes a workload representation generator configured to cause the at least one processor to provide a workload representation for each workload of the plurality of workloads, each workload representation including a contiguous time series reflecting workload execution of a corresponding workload within the license period.

6. The system of claim 5, wherein the baseline model generator includes an aggregator configured to cause the at least one processor to aggregate the individual workload representations of the plurality of workloads.

7. The system of claim 6, wherein the baseline model generator includes a normalization module configured to cause the at least one processor to normalize the aggregated individual workload representations, relative to a time series representing a total license cost during the license period, to thereby obtain the time-based contribution of each of the plurality of workloads to the license cost during the license period.

8. The system of claim 1, wherein the baseline model includes a cost graph representing the license cost during the license period, and workload representation graphs representing each of the plurality of workloads, relative to the cost graph.

9. The system of claim 8 further comprising a view generator configured to receive a request for at least one of the workload representation graphs, and further configured to cause the at least one processor to provide the baseline model displaying the requested workload representation graph relative to the cost graph.

10. The system of claim 1, wherein the first metrics include one or more of capacity ratings and hardware usage performance metrics, the capacity ratings including Processor Capacity Index (PCI) or Million Instructions per Second (MIPS), and the hardware usage performance metrics including Central Processing Unit (CPU) seconds or CPU utilization percent.

11. The system of claim 1, wherein the second metrics include one or more of a millions of service units used per hour (MSU) rating associated with a specific processor type and model, MSUs consumed in the license environment, or total MSU capacity of the license environment.

12. The system of claim 1, wherein the workload change request includes a request to add or remove a specific workload, a request to delay a time of execution of the specific workload, a request to modify a length of time of execution of the specific workload, or a request to move the specific workload from one part of the license environment to another part of the license environment on the mainframe computer.

13. A method for executing a plurality of workloads within a license environment on a mainframe computer, the method comprising:
receiving first metrics that measure performance of each of the plurality of workloads executed on the mainframe computer;
receiving second metrics that measure license costs incurred by different divisions of computing resources utilized on the mainframe computer other than workloads executed on the mainframe computer;
generating, by at least one processor, a baseline model combining the first metrics and the second metrics to provide a time-based contribution of each of the plurality of workloads executing on the mainframe computer to license costs during a license period;
receiving a workload change request and determining, by the at least one processor based on the baseline model, a change in the license costs caused by the workload change during the license period, wherein the workload change request includes a workload change from a source processor to a target processor, the source processor having a source cost rating that is different from a target cost rating of the target processor; and
changing, by the at least one processor, a distribution of the plurality of workloads across different divisions of the computing resources by moving the plurality of workloads from the source processor to the target processor responsive to the change in the license costs.

14. The method of claim 13, wherein the first metrics provide performance measures of processors within the license environment and include capacity ratings of the processors during times that the plurality of workloads are executed during the license period, and the second metrics are based on cost ratings of processors within the license environment previously defined by a licensor of the license environment.

15. The method of claim 13, wherein the baseline model includes a cost graph representing the license cost during the license period, and workload representation graphs representing each of the plurality of workloads, relative to the cost graph.

16. A computer program product including instructions recorded on a non-transitory computer readable storage medium and configured to cause at least one processor to:
receive first metrics that measure performance of each of a plurality of workloads executing on a mainframe computer;
receive second metrics that measure license costs incurred by different divisions of computing resources utilized on the mainframe computer other than workloads executed on the mainframe computer;
generate a baseline model combining the first metrics and the second metrics to provide a time-based contribution of each of the plurality of workloads executing on the mainframe computer to license costs during a license period;
receive a workload change request and determine, based on the baseline model, a change in the license costs caused by the workload change during the license period, wherein the workload change request includes a workload change from a source processor to a target processor, the source processor having a source cost rating that is different from a target cost rating of the target processor; and
change a distribution of the plurality of the workloads across different divisions of the computing resources by moving the plurality of workloads from the source processor to the target processor responsive to the change in the license costs.

17. The computer program product of claim 16, wherein the first metrics include performance measures of processors within the license environment and include capacity ratings of the processors during times that the plurality of workloads are executed during the license period, and the second metrics are based on cost ratings of processors within the license environment previously defined by a licensor of the license environment.

18. The computer program product of claim 16, wherein the baseline model includes a workload representation for each workload of the plurality of workloads, each workload representation including a contiguous time series reflecting workload execution of a corresponding workload within the license period.

19. The computer program product of claim 18, wherein the instructions, when executed, are further configured to cause the at least one processor to generate the baseline model including aggregating the individual workload representations of the plurality of workloads.

20. The computer program product of claim 19, wherein the instructions, when executed, are further configured to cause the at least one processor to normalize the aggregated individual workload representations, relative to a time series representing a total license cost during the license period, to thereby obtain the time-based contribution of each of the plurality of workloads to the license costs during the license period.

* * * * *